US008082208B2

(12) United States Patent
Gavin

(10) Patent No.: US 8,082,208 B2
(45) Date of Patent: Dec. 20, 2011

(54) COMPILATION AND ANALYSIS OF COMPANY INFORMATION

(76) Inventor: John Patrick Gavin, Plymouth, MN (US)

( * ) Notice: Subject to any disclaimer, the term of this patent is extended or adjusted under 35 U.S.C. 154(b) by 285 days.

(21) Appl. No.: 12/169,939

(22) Filed: Jul. 9, 2008

(65) Prior Publication Data

US 2009/0070253 A1 Mar. 12, 2009

Related U.S. Application Data

(60) Provisional application No. 60/948,609, filed on Jul. 9, 2007.

(51) Int. Cl.
*G06Q 40/00* (2006.01)
(52) U.S. Cl. ............................................. 705/38; 705/35
(58) Field of Classification Search ............... 705/38, 705/35
See application file for complete search history.

(56) References Cited

U.S. PATENT DOCUMENTS

| | | | |
|---|---|---|---|
| 6,154,731 A | 11/2000 | Monks | |
| 2001/0042037 A1 | 11/2001 | Kam | |
| 2002/0138408 A1* | 9/2002 | Lawrence | 705/38 |
| 2002/0138527 A1 | 9/2002 | Bell | |
| 2003/0212673 A1 | 11/2003 | Kadayam | |
| 2003/0225663 A1 | 12/2003 | Horan | |
| 2004/0194150 A1 | 9/2004 | Banker | |
| 2005/0144036 A1 | 6/2005 | Bell | |
| 2005/0154662 A1 | 7/2005 | Langenwalter | |
| 2005/0203896 A1 | 9/2005 | Weild | |
| 2005/0209943 A1 | 9/2005 | Ballow | |
| 2005/0209948 A1 | 9/2005 | Ballow | |
| 2005/0251466 A1 | 11/2005 | Mattsson | |
| 2005/0267827 A1* | 12/2005 | Grant et al. | 705/35 |
| 2005/0267835 A1 | 12/2005 | Condron | |
| 2005/0273422 A1 | 12/2005 | Villacorta | |
| 2006/0149657 A1 | 7/2006 | Weild | |
| 2006/0161448 A1 | 7/2006 | Weild | |
| 2006/0161472 A1 | 7/2006 | Weild | |

* cited by examiner

*Primary Examiner* — Samica L Norman
(74) *Attorney, Agent, or Firm* — Nicholas K. Beaulieu; Westman, Champlin & Kelly, P.A.

(57) ABSTRACT

Information about a company is compiled from a plurality of public sources. The information is then analyzed to identify a plurality of relevant factors from the information. The factors are used to rate risks associated with the company. A profile is generated based on the factors to summarize the risks associated with the company.

18 Claims, 11 Drawing Sheets

FIG. 2

DISCLOSURE INSIGHT®

5 Years of Analytical History in One Report — Last Updated: July 5, 2007

DELL, INC.
DELL - $28.99

D.I. SCORE™
37
OF 100 FACTORS FOUND

Mkt. Cap: $65.8 billion
Shares Out: 2.27 billion
Ownership --
Insider: 9.7%
Institutional: 66.6%
Shares Short --
34.2 million
1.8 Days to Cover
Avg. Daily Vol.: 19.3 mm
Fiscal Year: February
HQ: Austin, TX Better Disclosure.
Better Decisions.

SEC Insight, Inc.
3200 Harbor Lane
Suite 200
Plymouth, MN 55447
763-595-0900
secinsight@secinsight.com
www.secinsight.com

THE PAST 5 YEARS

| Categories Researched | | DI Factors Found | DI Factors Researched |
|---|---|---|---|
| SEC Activity / FOIA Data | Page 4 | 11 | 28 |
| Auditor / Accounting | Page 10 | 5 | 18 |
| Executive Suite | Page 15 | 9 | 12 |
| The Board | Page 18 | 4 | 16 |
| Capital Markets / Other | Page 20 | 6 | 19 |
| Non-SEC Activity | Page 26 | 2 | 7 |
| Totals: | | 37 | 100 |

SEC INVESTIGATION STATUS: In August 2006 Dell first disclosed an informal SEC investigation the company claims began in August 2005. Dell said it related to revenue recognition, accruals, reserves and other balance sheet items. In November 2006, Dell disclosed the investigation was formal. The company's filings are now delayed which it blames on the on the SEC probe. As a result it is being threatened with delisting by NASDAQ.

DELL'S PRESENT STATE

| | | | |
|---|---|---|---|
| | No CEO, CFO, and /or Chairman. | ● | Officer change in the past six months. |
| | No Auditor. | | Auditor change in the past six months. |
| ● | Delisting threatened or shares delisted. | | Multiple classes of stock. |
| | Trading in the stock suspended. | | Inside ownership > 25%. |
| | Small number of shares in the float < 50% | ● | Litigation with the potential to impact operations. |
| | Controlled company status per NASDAQ regulations. | | Internal investigation(s). |
| ● | Non-SEC investigative activity. | | Violation of debt covenants disclosed. |
| ● | Internal controls issues. | | No meaningful or concentrated revenue. |
| ● | Delayed filings. | | Restatement in the past six months. |
| ● | Company does not currently hold earnings conference calls. | ● | Company lowered revenue or earnings guidance in the past six months. |

DISCLOSURE INSIGHT®
DELL, INC. (DELL – $28.99)

LAST UPDATED: JULY 5, 2007
PAGE 2 of 26

| SEC Activity |
|---|
| Page 4 |
| SEC affirmed active-and-ongoing investigative activity on <DATE>. This affirmed SEC investigation was undisclosed as of this date. |
| SEC affirmed active-and-ongoing investigative activity that was undisclosed at the time. |
| SEC cited law enforcement grounds to block access to records on <DATE>. This potential SEC investigation was undisclosed as of this date. |
| SEC cited law enforcement grounds to block access to records. Potential SEC investigation was undisclosed at the time. |
| The company asserted confidentiality to have the SEC block access to records. |
| SEC activity with ambiguous nature. |
| Receipt of SEC comment letters disclosed by company (implying materiality). |
| Unresolved SEC comment letters. |
| Same or similar issues show up in separate SEC reviews. |
| • Revenue recognition is brought up in reviews. |
| • SEC Division of Corporation Finance comment letters available. |
| Contact with SEC's Office of the Chief Accountant. |
| • SEC investigative activity disclosed by the company. |
| • SEC investigative disclosures lacked detail on nature of the probe. |
| SEC investigative disclosures lacked detail on timing of first contact with SEC. |
| A disclosed SEC investigation that was unspecified as to whether informal or formal. |
| • Formal SEC investigation disclosed. |
| Investigation appeared to be formal; company failed to give prominence to this potential. |
| • Formal SEC investigative disclosures lacked detail on who received subpoenas. |
| • Formal SEC investigative disclosures lacked detail on what information subpoenas sought. |
| • Formal SEC investigative disclosures lacked detail on timing of when the company was informed the probe became formal. |
| • Subsequent disclosures on SEC investigation failed to provide meaningful updates. |
| • Delay of greater than 10 days in disclosing SEC investigation. |
| Delay of greater than 10 days in disclosing that SEC investigation was or appeared to become formal. |
| SEC investigation was initially disclosed in an EDGAR filing with no associated press release. |
| • SEC investigation related to revenue recognition. |
| Wells Notice disclosed. |
| Wells Notice-related disclosure lacked detail. |

28 - DI Factors Researched
11 - DI Factors Identified

| Auditor / Accounting |
|---|
| Page 10 |
| Auditor change. |
| Auditor change for unspecified reasons. |
| Negative auditor opinion. |
| Disagreement with auditor. |
| Noisy departure of auditor. |
| Auditor references company's inability to meet SOX 404 requirements. |
| Auditor indicated an inability to rely on management's representations. |
| Auditor referenced illegal acts. |
| Auditor not top tier. |
| Company moves from top tier to non-top tier auditor. |
| • Internal investigation of any kind. |
| • Internal investigation involving accounting. |
| • Internal controls; any issues disclosed. |
| Internal controls; a material weakness disclosed.[1] |
| Restatement of any kind. |
| • Delayed filings.[1] |
| • One-time charges. |
| Significant accounting change of any kind. |

18 - DI Factors Researched
5 - DI Factors Identified

| The Executive Suite |
|---|
| Page 15 |
| • CEO change. |
| • CEO change for unspecified reasons. |
| • CEO change appeared abrupt or unplanned. |
| • CFO change. |
| • CFO change for unspecified reasons. |
| • CFO change appeared abrupt or unplanned. |
| • Other senior officer change. |
| • Other senior officer change for unspecified reasons. |
| Other senior officer change appeared abrupt or unplanned. |
| Any major officer involved in criminal charges. |
| • Officer "retired" or "resigned" in the presence of controversy or problems. |

5 YEARS OF ANALYTICAL HISTORY IN ONE REPORT.™
© 2007 SEC Insight, Inc. All Rights Reserved. Patents Pending.

FIG. 4

DISCLOSURE INSIGHT®
DELL, INC. (DELL – $28.99)

LAST UPDATED: JULY 5, 2007
PAGE 3 of 26

| | Officer left with a big payoff in presence of controversy or problems. |
|---|---|
| | 12 – DI Factors Researched |
| | 9 – DI Factors Identified |

The Board
Page 18

410

| | |
|---|---|
| | Chairman change. |
| | Chairman change for unspecified reasons. |
| | Chairman change appeared abrupt or unplanned. |
| • | CEO and Chairman the same person. |
| • | Board member "retired" or "resigned" in the presence of controversy or problems. |
| | Board member left with a big payoff in presence of controversy or problems. |
| • | Audit committee involved in investigation(s).¹ |
| | Audit committee retained outside forensic accountants. |
| | Audit committee retained outside legal counsel. |
| • | Audit committee member change. |
| | Audit committee member resigned for unspecified reasons. |
| | Audit committee member departure appeared abrupt or unplanned. |
| | Audit committee member change was noisy. |
| | Independent director (non-audit committee) change. |
| | Independent director (non-audit committee) change appeared abrupt or unplanned. |
| | Independent director (non-audit committee) change was noisy. |

16 – DI Factors Researched
4 – DI Factors Identified

Capital Markets / Other Items
Page 20

420

| | |
|---|---|
| • | Company does not currently hold earnings conference calls.¹ |
| • | Litigation with the potential to impact operations.¹ |
| • | M&A activity. |
| | Acquisitions include earn-outs. |
| | M&A integration problems/challenges disclosed. |
| | Multiple classes of stock.¹ |
| | Small number of shares in the float < 50%.¹ |
| | Inside ownership > 25%.¹ |
| • | Delisting threatened by regulators.¹ |
| | Shares de-listed.¹ |
| | Trading in the stock is suspended.¹ |

| | Insider selling increasing over the past year. |
|---|---|
| • | Instances of 1-day stock price volatility of greater than 10% in the past year. |
| | Controlled company status per NASDAQ regulations.¹ |
| • | Company lowered revenue or earnings guidance in the past year. |
| | Violation of debt covenants disclosed.¹ |
| | No meaningful revenue.¹ |
| | Concentrated revenue.¹ |
| | Other. |

19 – DI Factors Researched
6 – DI Factors Identified

Non-SEC Activity
Page 26

430

| | |
|---|---|
| • | US Attorney/FBI activity. |
| • | US Attorney/FBI-related disclosures lacked detail on nature and/or timing of the activity. |
| | Grand Jury activity. |
| | Grand Jury-related disclosures lacked detail on nature and/or timing of the activity. |
| | IRS activity. |
| | IRS-related disclosures lacked detail on nature and/or timing of the activity. |
| | Investigations by other regulators. |

7 – DI Factors Researched
2 – DI Factors Identified

1  Important Notes: In addition to being critical factors in each major list, these items are also reviewed for inclusion in the Present-State factors appearing on page one of this report. 440

Present-State factors is a list of factors we selected that are in existence presently and/ or disclosed within the last three months as of the date of publication of the report

---

5 YEARS OF ANALYTICAL HISTORY IN ONE REPORT.™
© 2007 SEC Insight, Inc. All Rights Reserved. Patents Pending.

FIG. 5

DISCLOSURE INSIGHT®
DELL, INC. (DELL – $28.86)

LAST UPDATED: JULY 5, 2007
PAGE 4 of 26

SEC Activity – Freedom of Information Act History

| Event Date | What Happened | The Details |
|---|---|---|
| 5/30/02 | No investigative records found in response to an SEC Insight, Inc. FOIA request. | In a letter dated May 30, 2002, the SEC said the following: *Based on the information you provided in your letter, we conducted a thorough search of the Commission's various systems of records, but did not locate or identify any information responsive to your request.* This came in response to a FOIA request we had submitted on DELL covering the two-year period ending January 17, 2002. |
| 5/6/05 | No investigative records found in response to an SEC Insight, Inc. FOIA request. | In a letter dated May 6, 2005, the SEC said the following: *Based on the information you provided in your letter, we conducted a thorough search of the Commission's various systems of records, but did not locate or identify any information responsive to your request.* This information came in response to a FOIA request we had submitted on DELL covering the period from October 2003 to May 4, 2005. |

5 YEARS OF ANALYTICAL HISTORY IN ONE REPORT.™
© 2007 SEC Insight, Inc. All Rights Reserved. Patents Pending.

FIG. 6

DISCLOSURE INSIGHT®
DELL, INC. (DELL – $28.86)

LAST UPDATED: JULY 5, 2007
PAGE 15 of 26

| The Executive Suite<br>Snapshot: Executive Officer 5-Year History<br>(Shaded Cells Indicate a Change from Prior Year's Filing) | 4/30/02 | 3/31/03 | 3/31/04 | 3/7/05 | 3/15/06 | Changes Disclosed since 3/15/06 |
|---|---|---|---|---|---|---|
| Chairman | Dell | Dell | Dell | Dell | Dell | |
| CEO | Dell | Dell | Dell | Rollins | Rollins | Dell |
| COO | Rollins | Rollins | Rollins | - | - | |
| CFO | Schneider | Schneider | Schneider | Schneider | Schneider | Carty |
| General Counsel | Green | Green | Green | Tu | Tu | |
| SVP or VP, Asia Pacific-Japan | Amelio | Amelio | Amelio | Amelio | Felice | |
| SVP, Europe, Middle East and Africa | Bell | Bell | Bell | Bell | Bell | |
| SVP, Americas | Marengi, Parra | Marengi, Parra | Marengi, Parra | Marengi, Parra | Marengi, Parra | |
| SVP, Product Group | - | Clarke, Medica | Clarke, Medica | Clarke, Medica, Gruzen | Clarke, Medica, Gruzen, Anderson | |
| SVP, U.S. Consumer Business | - | Hamlin | Hamlin | Hamlin | - | |
| SVP, Global eBusiness Group, Global Brand Marketing, and Dell International Services | - | - | - | - | Hamlin | |
| SVP, Worldwide Procurement and Global Customer Experience | - | - | - | Garvin, Neland | Neland | |
| SVP, Worldwide Procurement | - | - | - | - | Garvin | |
| SVP, HR | - | - | - | McKinnon | McKinnon | |
| Chief Information Officer | - | - | - | Mott | Shesker | |

5 YEARS OF ANALYTICAL HISTORY IN ONE REPORT.™
© 2007 SEC Insight, Inc. All Rights Reserved. Patents Pending.

FIG. 7

DISCLOSURE INSIGHT®
DELL, INC. (DELL - $28.86)

LAST UPDATED: JULY 5, 2007
PAGE 18 of 26

The Board: A 5-Year Snapshot
(Shaded Cells Indicate a Change from Prior Year's Filing)

| 7/12/02 | 7/17/03 | 7/15/04 | 7/14/05 | 7/20/06 | Currently |
|---|---|---|---|---|---|
| Donald Carty A | Donald Carty A | Donald Carty A | Donald Carty A* | Donald Carty A* | Donald Carty E |
| Michael Dell E^ | Michael Dell E^ | Michael Dell E^ | Michael Dell E^ | Michael Dell E^ | Michael Dell E^ |
| William Gray, III A,N | William Gray, III A,N | William Gray, III A,N | William Gray, III A,N | William Gray, III A,N | William Gray, III A,N |
| Judy Lewent F | Judy Lewent F | Judy Lewent F,C | Judy Lewent F,C | Judy Lewent F,C | Judy Lewent F*,C |
| Thomas Luce, III A | Thomas Luce, III A | Thomas Luce, III A | Thomas Luce, III A | | Thomas Luce, III A* |
| Klaus Luft F | Klaus Luft C | Klaus Luft C | Klaus Luft C | Klaus Luft C | Klaus Luft C |
| Alex Mandl F | Alex Mandl F | Alex Mandl F | Alex Mandl F* | Alex Mandl F* | Alex Mandl A |
| Michael Miles C,N | Michael Miles C,N | Michael Miles C,N | Michael Miles C*,N | Michael Miles C*,N | Michael Miles C*,N |
| Samuel Nunn, Jr. A,N | Samuel Nunn, Jr. A,N | Samuel Nunn, Jr. A,N | Samuel Nunn, Jr. A,N* | Samuel Nunn, Jr. A,N* | Samuel Nunn, Jr. A,N* |
| Morton Topfer E,F | Morton Topfer E,F | Morton Topfer E,F | Kevin Rollins E | Kevin Rollins E | Sallie Krawcheck F |
| Michael Jordan F,C | Michael Jordan F,C | | | | Alan Lafley F,C |

Committee Key: A = Audit, C = Compensation, F = Finance, N = Nominating and Governance, * = Chair, ^ = Chairman of the Board
Other Keys: E = employee or former employee
(Source: Dell's SEC filings and company website)

*5 YEARS OF ANALYTICAL HISTORY IN ONE REPORT.*™
© 2007 SEC Insight, Inc. All Rights Reserved. Patents Pending.

| Disclosure Insight® | NUANCE COMMUNICATIONS INC. |
| --- | --- |
| D.I. Report™ | June 5, 2008 |

D.I. PROFILE™ UPDATE SINCE 16-JAN-08

910

SEC Activity: No new information found.

Auditor & Accounting: Nuance reported $5.5 million of restructuring and other charges for the first six months of FY08.

Executive Suite: A new Principal Accounting Officer was appointed; the previous Principal Accounting Officer will remain as the corporate controller. This means the CFO, Controller, and Principal Accounting officer are now separate people.

The Board: Charles Berger, the CEO of former Nuance before its acquisition by Scansoft to create, resigned from the board.

Capital Markets: Nuance acquired eScription, a provider of computer aided medical transcription technology for approximately $381 million on 20-May-08. There have been additional stock price volatility events >10% since we last published on this company in Jan-08. Our M&A analysis added one point to the D.I. Score™

Non-SEC Activity: No new information found.

920

D.I. SCORE™ HISTORY

| Categories | Report Dates | | Risk Factors Researched |
| --- | --- | --- | --- |
| | 16-Jan-08 | 5-Jun-08 | |
| SEC Activity | 12 | 12 | 27 |
| Auditor & Accounting | 13 | 13 | 19 |
| Executive Suite | 6 | 6 | 12 |
| The Board | 7 | 7 | 16 |
| Capital Markets | 6 | 7 | 19 |
| Non-SEC Activity | 1 | 1 | 7 |
| D.I. SCORE™ | 45 | 46 | 100 |

260

NUAN'S PRESENT STATE

| | | | | | |
| --- | --- | --- | --- | --- | --- |
| | No permanent CEO or Chairman. | ● | Officer change in the past 6 months. | | Float < 50% shares outstanding. |
| | No permanent CFO. | | Auditor event(s) in the past 6 months. | | Delayed filings. |
| ● | SEC investigative activity. | | Multiple classes of stock. | | Restatement in the past 6 months. |
| | Trading in the stock suspended. | ● | Inside ownership > 25%. | | Internal controls issues. |
| | Company does not currently hold earnings conference calls. | ● | Litigation with the potential to impact operations. | | Company lowered revenue or earnings guidance in the past 6 months. |
| | Controlled company status. | | Internal investigation(s). | | Concentrated revenue or no meaningful revenue. |
| | Non-SEC investigative activity. | | Violation of debt covenants disclosed. | | Delisting threatened or shares delisted. |

*5 YEARS OF DUE DILIGENCE IN ONE REPORT.™*
www.disclosureinsight.com © 2008 Disclosure Insight, Inc. All Rights Reserved. Patents Pending.

Page 2 of 18

FIG. 10

Disclosure Insight®
D.I. Report™

NUANCE COMMUNICATIONS INC.
June 5, 2008

SEC ACTIVITY

Overview and Opinion: It was Feb-06 when NUAN first disclosed SEC investigative activity related to an acquired entity called SpeechWorks. The last time the company specifically mentioned the SEC inquiry was in an 8-K filed 11-Apr-07. On 21-Jun-07 and 27-Sep-07, respectively, the SEC brought charges against former SpeechWorks employees and another company involved with SpeechWorks called Intervioce. With over a year having passed since the company specifically mentioned the SEC inquiry and charges having been brought, it is likely that the risk associated with this issue is substantially reduced if not over.

There are letters available from 2 reviews by the SEC's Division of Corporation Finance. The first review, from 30-Jun-05 to 1-Aug-05, asked about internal controls. The second review, from 27-Jun-07 to 23-Aug-07, pertained to an S-4 for the acquisition of VoiceSignal Technologies, Inc.

| 27 Risk Factors Researched | 12 Risk Factors Found |
|---|---|
| • SEC affirmed active-and-ongoing investigative activity that was undisclosed at the time. | • Delay of greater than 10 days in disclosing SEC investigation. |
| • SEC cited law enforcement grounds to block access to records. Potential SEC investigative activity was undisclosed at the time. | Delay of greater than 10 days in disclosing that SEC investigation was or appeared to become formal. |
| The company asserted confidentiality to have the SEC block access to records. | • SEC investigation was initially disclosed in an EDGAR filing with no associated press release. |
| SEC activity with ambiguous nature. | • SEC investigation related to revenue recognition. |
| • SEC investigative activity disclosed by the company. | Wells Notice disclosed. |
| • SEC investigative disclosures lacked detail on nature of the probe. | Wells Notice-related disclosure lacked detail. |
| • SEC investigative disclosures lacked detail on timing of first contact with SEC. | • Receipt of SEC comment letters or an SEC review disclosed by company (implying materiality). |
| • A disclosed SEC investigation that was unspecified as to whether informal or formal. | A protracted SEC review (lasting > 6 months). |
| Formal SEC investigation disclosed. | Unresolved SEC comment letters. |
| Investigation appeared to be formal, company failed to give prominence to this potential. | Same or similar issues show up in separate SEC reviews. |
| Formal SEC investigative disclosures lacked detail on who received subpoenas. | Revenue recognition is brought up in reviews. |
| Formal SEC investigative disclosures lacked detail on what information subpoenas sought. | • SEC Division of Corporation Finance comment letters available. |
| Formal SEC investigative disclosures lacked detail on timing of when the company was informed the probe became formal. | Contact with SEC's Office of the Chief Accountant. |
| • Subsequent disclosures on SEC investigation failed to provide meaningful updates. | |

Present State: Confirmed SEC investigation as of late Sep-07. NUAN last disclosed SEC investigative activity in Apr-07.

Freedom of Information Act Data: Confirmed SEC investigation as of late Sep-07. NUAN last disclosed SEC investigative activity in Apr-07.

11-Feb-05: In a letter, the SEC first blocked our access to records on law enforcement grounds, which indicates potential involvement in SEC investigative activity.

27-Sep-05: In a letter, the SEC confirmed an active and ongoing probe of Nuance.

6-Jun-07: In a letter, the SEC blocked our access to records on law enforcement grounds, which indicates potential involvement in SEC investigative activity.

27-Sep-07: In a letter, the SEC confirmed that NUAN was involved in an SEC investigation.

5 YEARS OF DUE DILIGENCE IN ONE REPORT.™
www.disclosureinsight.com © 2008 Disclosure Insight, Inc. All Rights Reserved. Patents Pending.

ically traded companies. For example, a publicly traded com-

COMPILATION AND ANALYSIS OF COMPANY INFORMATION

RELATED APPLICATION

This application claims the benefit of U.S. Patent Provisional Application Ser. No. 60/948,609, filed on Jul. 9, 2007 and titled "Method of Compilation and Analysis of Company Information," the entirety of which is hereby incorporated by reference.

BACKGROUND

There is a multitude of sources of information about publicly traded companies. For example, a publicly traded company has to comply with certain disclosure rules, so a great deal of information about the company can be found in U.S. Securities and Exchange Commission ("SEC") filings. Other factual information about the company can be found in news articles, press releases, and other readily available sources of information. Yet more information can be obtained through more complex processes, such as by making Freedom of Information Act ("FOIA") requests. All of this information can be relevant to investors and analysts as they seek to assess the risk of investing in a company.

While all of this information is available, collection of the information can be difficult. Also, even if the information is collected, deriving relevant facts from the information can be difficult. For example, SEC filings can be hundreds of pages in length, and it can be difficult to understand where relevant facts are contained within such filings. Further, even when the relevant facts can be found, it is difficult to analyze the various facts to create an overall assessment of the risks involved in investing in a company.

SUMMARY

The present disclosure relates to the compilation and analysis of company information. In one example, information about a company is compiled from a plurality of public sources. The information is then analyzed to identify a plurality of relevant factors from the information. The factors are used to rate risks associated with the company. A profile is generated based on the factors to summarize the risks associated with the company.

DESCRIPTION OF THE DRAWINGS

Reference is now made to the accompanying drawings, which are not necessarily drawn to scale.

FIG. 2 shows an example profile for a company.

FIG. 3 shows another page of the profile of FIG. 2.

FIG. 4 shows another page of the profile of FIG. 2.

FIG. 5 shows another page of the profile of FIG. 2.

FIG. 6 shows another page of the profile of FIG. 2.

FIG. 7 shows another page of the profile of FIG. 2.

FIG. 9 shows another page of the profile of FIG. 8.

FIG. 10 shows another page of the profile of FIG. 8.

DETAILED DESCRIPTION

Example embodiments will now be described more fully hereinafter with reference to the accompanying drawings.

These embodiments are provided so that this disclosure will be thorough and complete. Like numbers refer to like elements throughout.

The present disclosure relates to the compilation and analysis of company information. In one example, information about a company is compiled from a plurality of public sources. The information is then analyzed to identify a plurality of relevant factors from the information. The factors are used to rate the risks associated with the company. A profile is generated based on the factors to summarize the risks associated with the company. For example, the profile can be used as a quick-reference tool that summarizes due diligence analysis for the company. Each profile can be generated through a process of identifying and evaluating possible risk factors associated with the company. The profile can provide a concise summarize of the risk factors (e.g., in categories) over a relevant time period (e.g., 6 months, 1 year, 2 years, 5 years, etc.) arranged in an easy-to-digest format.

As described further below, the methods described herein can be used to generate profiles for a plurality of companies, such as publicly-traded companies. Each of the profiles can be provided in hard copy or electronic formats to individuals and entities, such as investors and investment companies, who are interested in learning about the profiled companies.

Figure 1:
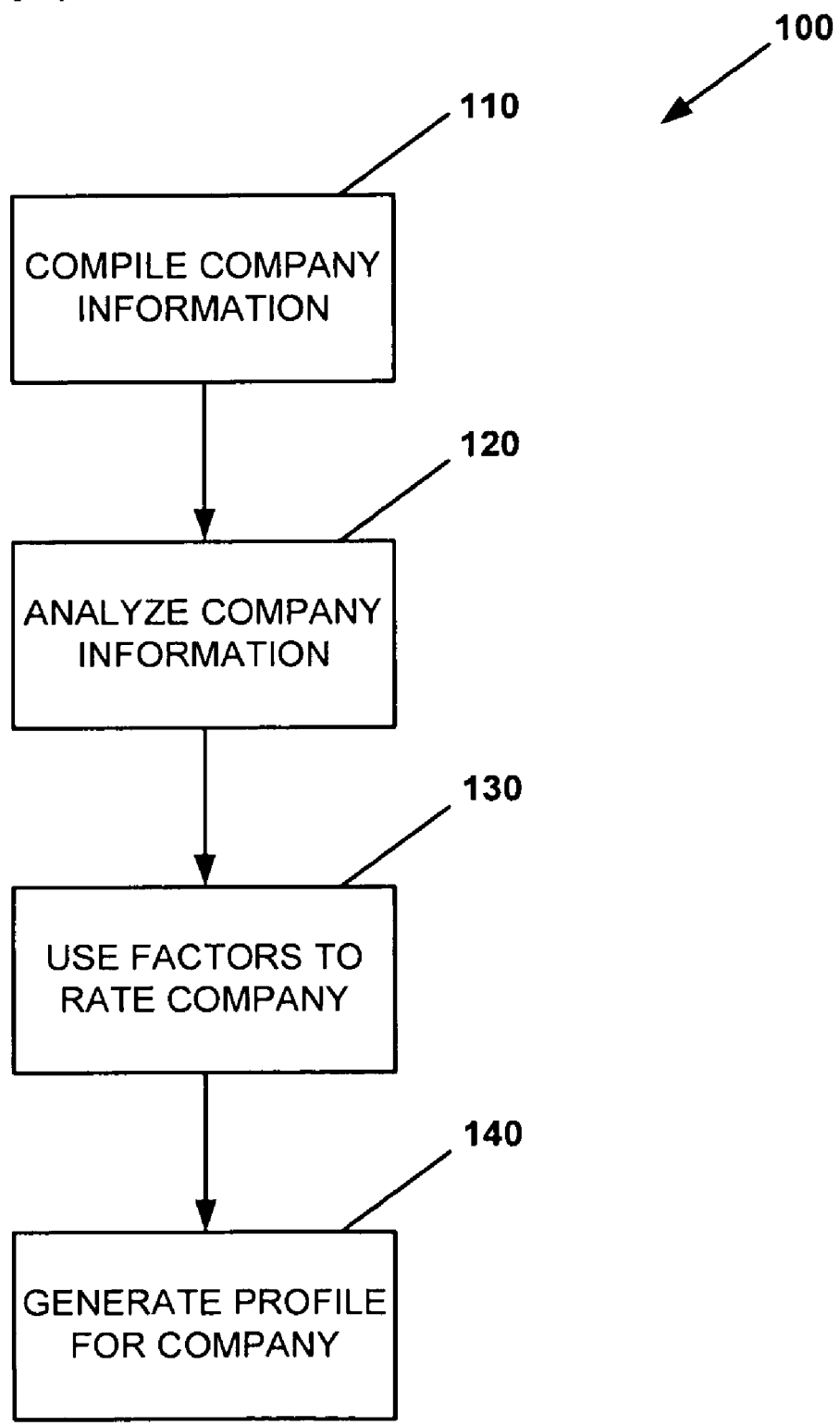
FIG. 1 shows an example method for creating a profile for a company.

Referring now to FIG. 1, an example method 100 of compiling and analyzing information to create a profile for a company is provided. In example embodiments, the company is a publicly traded company, although other types of companies can also be profiled.

Initially, at an operation 110 of the method 100, company information is compiled. In example embodiments, a plurality of procedures is used to compile information from a plurality of sources related to the company. For example, in the embodiment shown, 100 factors are examined as part of the compilation process. In alternatives, different factors or numbers of factors can be examined. For example, in other embodiments, 20, 25, 40, 50, 75, 120, 150, or 200 total factors can be examined. Other configurations are possible.

In one embodiment, the factors are selected to identify risks associated with the company, such as, for example, an SEC investigation or a recent change in leadership. These risks can be used to indicate a problem with the company that might affect performance.

In the example shown, one or more analysts are trained to compile the information about the company from public sources of information. The analysts can do this by obtaining both hard and soft copy materials related to the company, as described below. The analysts can collect information that is available from free and/or pay sources, such as electronic databases of information. An analyst can use a template as part of the compilation and analysis process to assist the analyst in compiling and analyzing the results. One example of such a template is provided in attached Appendix A hereto, which is incorporated by reference.

In example embodiments, data is compiled from a plurality of sources including, but not limited to: (i) SEC filings; (ii) other regulatory filings; (iii) court filings; (iv) FOIA requests; (v) press releases; and (vi) news articles. Other sources of information can also be used.

Once data compilation is complete, control is passed to an operation 120, and the compiled data is analyzed.

In one embodiment, information is compiled and analyzed for the following categories of data: (1) SEC Activity; (2) Auditor/Accounting; (3) Executive Suite; (4) Board; (5) Capital Markets; and (6) Non-SEC Activity. As part of the compilation process, the following information is compiled relating to the SEC Activity category:

SEC affirmed active-and-ongoing investigative activity that was undisclosed at the time;
SEC cited law enforcement grounds to block access to records; Potential SEC investigation was undisclosed at the time;
The company asserted confidentiality to have the SEC block access to records;
SEC non-investigative activity;
SEC investigative activity;
SEC investigative disclosures lacked detail on nature of the probe;
SEC investigative disclosures lacked detail on timing of first contact with SEC;
A disclosed SEC investigation that was unspecified as to whether informal or formal;
Formal SEC investigation disclosed;
Investigation appeared to be formal; company failed to give prominence to this potential;
Formal SEC investigative disclosures lacked detail on who received subpoenas;
Formal SEC investigative disclosures lacked detail on what information subpoenas sought;
Subsequent disclosures on SEC investigation failed to provide meaningful updates;
Delay of greater than 10 days in disclosing SEC investigation;
Delay of greater than 10 days in disclosing that SEC investigation was or appeared to become formal;
SEC investigation was initially disclosed in an EDGAR filing with no associated press release;
SEC investigation related to revenue recognition;
Wells Notice disclosed;
Wells Notice-related disclosure lacked detail
SEC Division of Corporation Finance comment letters available;
Contact with the SEC's Office of Chief Accountant;
Receipt of SEC comment letters disclosed by company (implying materiality);
Unresolved SEC comment letters;
Same or similar issues show up in multiple SEC reviews; and
Revenue recognition is brought up in reviews.

In example embodiments, this information can be obtained from SEC filings and by making FOIA requests. In one example, SEC filing information is obtained from the SEC web site located at www.sec.gov, or another source of SEC filing information, such as the 10k Wizard products located at www.10kwizard.com ("10k Wizard"). The 10k Wizard allows one to search through SEC filings using keywords.

SEC investigations can be located using the 10k Wizard with the following search string: "SEC or subpoena* or informal* or formal* or investigate or investigate or probe or inquiry or inquiries or inquire or enforcement" (the "*" denotes stemming that will find any two or more additional characters). To find out if the company has disclosed a Wells Notice, the following search string can be used with the 10K Wizard: "Wells near(2) Notice*" (the "near(n)" operator is a proximity operator that searches for the first word within "n" words of the second word). If the SEC investigation is disclosed in an 8-K, the 8-K is checked to see if there is a press release attached to the 8-K as an exhibit 99.1. Any contact with the SEC's Office of Chief Accountant is also noted. A 10k Wizard search using "chief near(2) accountant" can be used to find these references. Information that is compiled can include source, SEC investigative information, and disclosure information.

Comment letters often come in a series. The goal is to capture the main points from the comment letters in each series. Each point should include a label such as revenue disclosures, revenue recognition, assets, Non-GAAP metrics, expense disclosures, etc. Following the label should be a short description of the key point. The point of the label is to see if the SEC is asking questions on the same issues through different reviews. If a particular comment letter covers 20 points, then there should be twenty points under key points for the letter. The SEC comments on many things in company filings. Typical reviews that should include more detail are reviews of 10-Qs, 10-Ks, and 8-Ks items 4.02, 4.01, 5.02. Other times there will be comment letters that may not contain particularly important information, for example, a no review letter for a registration statement. In that case, a simple description such as "SEC indicated that it did not review the registration statement" should be included. However, a review of a registration statement may or may not contain important information, depending on the SEC's comments. Information that is compiled can include date of comments/responses, pages of relevant information, and key points.

As part of the compilation process, the following information is compiled relating to the Auditor/Accounting category:
Auditor change;
Auditor change for unspecified reasons;
Internal investigation;
Negative auditor opinion;
Disagreement with auditor;
Noisy departure of auditor;
Auditor references company's inability to meet SOX 404 requirements;
Auditor indicated an inability to rely on management's representations;
Auditor referenced illegal acts;
Auditor not top tier;
Company moves from top tier to non-top tier auditor;
Internal controls problems;
Restatement of any kind;
Delayed filings;
Filings are delayed as of the publication date of this report;
One-time charges;
Significant accounting change of any kind; and
Other.

When there is a change in the auditor, the company files an 8-K coded 4.01. Proxies and 10-Ks will also list the auditor. As part of the filing or an amended version of the filing, the auditor has to provide a letter indicating whether it agrees with the company's disclosure on the auditor's departure. The auditor's opinion in the 10-K provides information on whether the auditor agrees with the company or if the auditor has any other issues of note. The top tier auditors are KPMG, Ernst & Young, Price Waterhouse Coopers, and Deloitte & Touche.

Internal investigations or reviews should show up when the search for SEC investigations is conducted using the same search string. Restatements can be seen in the financial filings by looking for 10-Qs and 10-Ks denoted as 10-Q/A and 10-K/A. There should be an explanation in the amended filing describing why it is amended or restated. Additionally, the 10k Wizard can be used with the search string "restatement*" to find restatements that may have been included in current filings rather than amended filings. Internal control problems can be found by looking at management's report on internal controls in the 10-Qs and 10-Ks. If there are no problems then there is no need to note it. Delayed filings will be denoted with as NT 10-Q or NT 10-K. Inside the filing there is an explanation for the delay. One-time charges can be found by looking in the income statement of a 10-K. Additionally, the management's discussion and analysis section in the 10-K also typically notes any one-time items. Goodwill impairments, write-off of intangibles, restructuring charges, etc. are also analyzed. Significant account changes will also often be included in the MD&A section, or a 10-K Wizard search using "accounting near(2) change" can also be productive.

As part of the compilation process, the following information is compiled relating to the Executive Suite category:
 CEO change;
 CEO change for unspecified reasons;
 CEO change appeared abrupt or unplanned;
 CFO change;
 CFO change for unspecified reasons;
 CFO change appeared abrupt or unplanned;
 Other senior officer change;
 Other senior officer change for unspecified reasons;
 Other senior officer change appeared abrupt or unplanned;
 Any major officer involved in criminal charges;
 Officer "retired" or "resigned" in the presence of controversy or problems;
 Officer left with a big payoff in presence of controversy or problems; and
 Other.

The easiest source for finding this data is to look in the company's proxy statements (form DEF 14A) or 10-K. The proxy statement will typically have a salary table which includes the top executives, while the 10-K may have a more extensive list of executive officers. Choose whichever document has the most listed executives. Beyond the most recent proxy or 10-K, looking at 8-Ks coded 5.02 should report any major changes to the executive officers. The dates each executive was with the company are based on the disclosure in whatever document is used as the source. For instance, a table of executive officers in a 10-K may say that these are the executive officers as of a certain date. If there is no reference as to the date, then assume that the filing date for the document can be used. Information that is compiled can include a historical record of the individuals holding each executive officer position for a certain number of years, such as five years.

Reasons regarding changes in executive officers can also be recorded. 8-Ks coded 5.02 are the best source for this type of information. If there is no 8-K found, then typing the executive's name into the 10K Wizard and searching the company filings is another alternative. Often a press release will have some different information that the 8-K. Information that is recorded about the change can include position, date and source of information, reason disclosed for change, and disclosure of change.

As part of the compilation process, the following information is compiled relating to the Board category:
 Chairman change;
 Chairman change for unspecified reasons;
 Chairman change appeared abrupt or unplanned;
 CEO and Chairman the same person;
 Audit committee involved in investigation(s);
 Audit committee retained outside forensic accountants;
 Audit committee retained outside legal counsel;
 Board member "retired" or "resigned" in the presence of controversy or problems;
 Board member left with a big payoff in presence of controversy or problems;
 Audit committee member change;
 Audit committee member resigned for unspecified reasons;
 Audit committee member departure appeared abrupt or unplanned;
 Audit committee member change was noisy;
 Independent director (non-audit committee) change.
 Independent director (non-audit committee) change appeared abrupt or unplanned;
 Independent director (non-audit committee) change was noisy;
 Involved in internal investigation;
 Hired forensic accountants; and
 Hired outside legal counsel.

Typically, an 8-K coded 5.02 will disclose any changes in the board. The current board is often listed on a company's website. The Def 14A can list the current board of directors or it can list the Board as it will appear if the recommendations for voting are followed by the shareholders. Information that is compiled can include a historical record of the individuals holding each board position for a certain number of years, such as five years. Information that is recorded about the changes in board members can include position, dates of service, reason disclosed for change, and disclosure of change.

The information related to the audit committee using forensic accountants, being involved in an internal investigation, or for retaining outside legal counsel is typically included as part of the disclosure of internal investigations by a company. Otherwise, a 10k Wizard search using "forensic" or "outside near(2) legal" can be used to find the specific items. Information that is recorded about the audit committee includes activity, date and source, and disclosure of activity.

As part of the compilation process, the following information is compiled relating to the Capital Markets category:
 Company does not currently hold earnings conference calls;
 Instances of litigation with the potential to impact the operations of the company today;
 M&A activity;
 Acquisitions include earn-outs;
 M&A integration problems/challenges disclosed;
 Multiple classes of stock;
 Small number of shares in the float <50%;
 Inside ownership exceeds 25%;
 Delisting threatened by regulators.
 Trading in the stock is suspended;
 Insider selling increasing over the past year;
 Instances of 1-day stock price volatility of greater than 10% in the past year;
 Controlled company status per NASDAQ regulations;
 Company lowered revenue or earnings guidance in the past year;
 Violation of debt covenants disclosed;
 No meaningful revenue;
 Concentrated revenue;
 Number of disclosed acquisitions;
 Number of acquisitions disclosing earn outs; and
 M&A integration problems/challenges disclosed.

The last quarterly press release announcing quarterly results can be checked to see if the company holds earnings conference calls. The most relevant litigation is found in the company's most recent 10-K and 10-Q. Additionally, press releases and 8-Ks can also provide for disclosure of litigation. The types of litigation that are most relevant include intellectual property issues and injunctions of business activities.

10-Ks typically include a section on M&A activity. Additionally, the 10k Wizard can be used with the following terms to find the information: "Acquisition* or merg* or merge or acquir* or aquire". For each merger, relevant information includes price paid, earnouts, goodwill, intangibles, and any operating metrics. Revenue in particular is important. One way to make a quick check to determine if any M&A activity has occurred over the course of a year is to compare the goodwill and intangible asset accounts on balance sheets. Multiple classes of stock can be collected from the most recent 10-Q or 10-K by looking at the balance sheet. If there is more than one class of stock outstanding, note the features of each class.

Small number of shares in the float <50% is the number of shares not held by insiders and strategic investors. To determine, subtract the insider holdings and shares held by strategic investors from the fully diluted share count. Strategic investors can be found in the most recent proxy since they typically own more than 5% of the shares outstanding. The most common type of strategic investors is other companies. Inside ownership >25% is equity securities held by the management and the board. The most recent proxy provides information, as does many of the financial websites such as Yahoo Finance (finance.yahoo.com) and MSN Money (moneycentral.msn.com).

Threatened delisting is typically the result of late filings. As such, ongoing NT 10-Qs and/or NT 10-Ks should be a signal to look for a threatened delisting by regulators. For NASDAQ listed companies the search string "staff near(2) determination" can be used to find threatened delistings using the 10K Wizard. For NYSE listed companies, the search string "NYSE near(2) regulation". "delisting" can also be used. Insider transaction information can be obtained from numerous financial information companies such as the WSJ. Instances of 1-day stock volatility greater than 10% can be found by pulling up a chart on Yahoo Finance and looking for the large moves in the stock price. The range on the chart can then be adjusted to look in greater detail. Once the day is found, the company's new releases or SEC filings can be checked to find an explanation.

For a controlled company, a 10k Wizard search of "controlled near(2) company" can be used. The NASDAQ rule 4350 (c)(5) definition of a controlled company is: "A Controlled Company is a company of which more than 50% of the voting power is held by an individual, a group or another company. A Controlled Company relying upon this exemption must disclose in its annual meeting proxy statement (or, if the issuer does not file a proxy, in its Form 10-K or 20-F) that it is a Controlled Company and the basis for that determination." The ownership data is available in the most recent proxy statement or in the 10-K if the company is "controlled." Several financial websites also offer data on insider ownership.

Instances of company lowered revenue or earnings guidance can be found in earnings press releases issued by the company. Additionally, reviewing transcripts of earnings conference calls is also a source of information regarding changes. Violation of debt covenants or events of default can be found by a 10K Wizard search using the search terms "covenant*" or "default*". Revenue concentration or lack of revenue can be found in a company's 10-K or 10-Qs, including whether a significant portion of the company's revenue comes from a single source or a few sources.

As part of the compilation process, the following information is compiled relating to the Non-SEC Activity category:
  US Attorney/FBI activity;
  US Attorney/FBI-related disclosures lacked detail on nature and/or timing of the activity;
  Grand Jury activity;
  Grand Jury-related disclosures lacked detail on nature and/ or timing of the activity;
  IRS activity;
  IRS-related disclosures lacked detail on nature and/or timing of the activity;
  Investigations by other regulators; and
  Other.

The data for this section will often be found when researching the other sections. For example, the search string used in find SEC investigation activity is the same search string that is used in this section. Additionally, companies often disclose investigative and regulatory issues in the same section as litigation. Additionally, a separate 10K wizard search can be conducted using the terms: "grand jury, FBI, Federal near(2) Bureau of Investigation, IRS, Internal near(2) Revenue Service, DOJ, Department near(2) Justice, U.S. Attorney, Office near(2) Attorney".

In some examples, all of the information identified above is collected for a specified time period, such as one, two, five, or ten years.

Once the information has been compiled and analyzed, control is passed to an operation 130, and the information is used to rate the company. In example embodiments, the company can be rated individually, rated within a particular industry, and/or rated generally with all other companies.

In one example, each factor that is compiled and analyzed is attributed a score. In the example shown, each factor is given a value of 1, although other schemes can be used. For example, in an alternative embodiment, different factors can be weighted differently depending on importance or timeliness.

In the example shown, the company's overall score is calculated by summing the number of positive factors identified during compilation and analysis. For example, if 37 factors are identified during compilation and analysis, the company's overall score is a 37. Other methods can be used to arrive at a specific score. A low overall score indicates a lower number of risk factors were found, while a higher score indicates that a higher number of risk factors associated with the company were found.

In alternative embodiments, the company's overall score can be used to assign a rating for the company. For example, a numeric (e.g., 1-5), alphanumeric (A-F), or star (1-5 stars) can be assigned depending on the company's overall score.

Next, at an operation 140, a profile for the company is generated. In one example, the profile is a hard copy report that details the results of the compilation, analysis, and rating of the company. In other examples, the profile is an electronic report, as described further below.

In the example shown, the method 100 is used to assess risks associated with publicly-traded U.S. companies. In other embodiments, the method 100 can be used to assess risk associated with privately-held companies or non-U.S. companies. In such instances, the method 100 can be modified as necessary to reflect the information available and to assess the risks associated with such companies.

In example embodiments, the analysts that compile the data can also be trained to analyze the data, score the company, and generate the profile for the given company. The method 100 is configured such that an analyst with limited experience and education (e.g., a bachelor's degree) can implement the method 100. The method 100 is streamlined such that a single analyst can profile one or more companies in a given amount of time, such as two profiles in one week. In alternative embodiments, the compilation of data can be partially or fully automated.

Referring now to FIGS. 2-7, an example profile 200 for a company is shown. The profile 200 includes information that was collected using the method 100 described above.

Generally, as shown in FIG. 2, the profile 200 includes a title bar 210 that lists the company's name and current stock price, if applicable. The profile also includes the overall score for the company in box 220. General bibliographic information about the company is included in column 230. Such information can include market capitalization, shares outstanding, ownership information, shares short, average daily volume, fiscal year end, and headquarters location.

The profile 200 also includes a Table 240 that provides a summary of the categories of information that were compiled and analyzed. Table 240 lists the number of factors found for the particular company for each category, as well as the total number of factors examined for each category. An optional box 250 provides a summary of the status of any significant and/or ongoing SEC investigations for the company. A Table 260 lists present state factors that are currently in existence or have happened within a certain period of time of the creation of the profile 200, such as one month, three months, six months, or one year. Other time periods, such as anything captured within 0-12 months, can be used. A bullet next to an item indicates that the particular item is applicable to the company.

Referring now to FIGS. 3 and 4, this part of the profile 200 includes Tables 310, 320, 330, 410, 420, 430 that each provides the factors examined for each category. For example, the Table 310 lists the factors examined for the SEC Activity category. As above, a bullet next to a factor indicates that the particular factor is applicable to the company. Each of the Tables 310, 320, 330, 410, 420, 430 also provides a page reference to another part of the profile 200 that provides additional details on each factor found. A section 440 of the profile 200 provides important notes regarding the substance of the profile 200.

Referring now to FIG. 5, an example Table 510 of the profile 200 is shown. The Table 510 provides details regarding the factors identified under the SEC Activity category. Each entry in the Table 510 provides the date of the event, an explanation of what happened, and details of the event.

Referring now to FIG. 6, an example Table 610 of the profile 200 is shown. The Table 610 provides details of the executive suite examined as part of the Executive Suite category. Each entry in the Table 610 provides the executive position, and the individual(s) holding the position for each of the past five years.

Referring now to FIG. 7, an example Table 710 of the profile 200 is shown. The Table 710 provides details of the board examined as part of the Board category. Each entry in the Table 710 provides the board members for each of the past five years.

Figure 8:
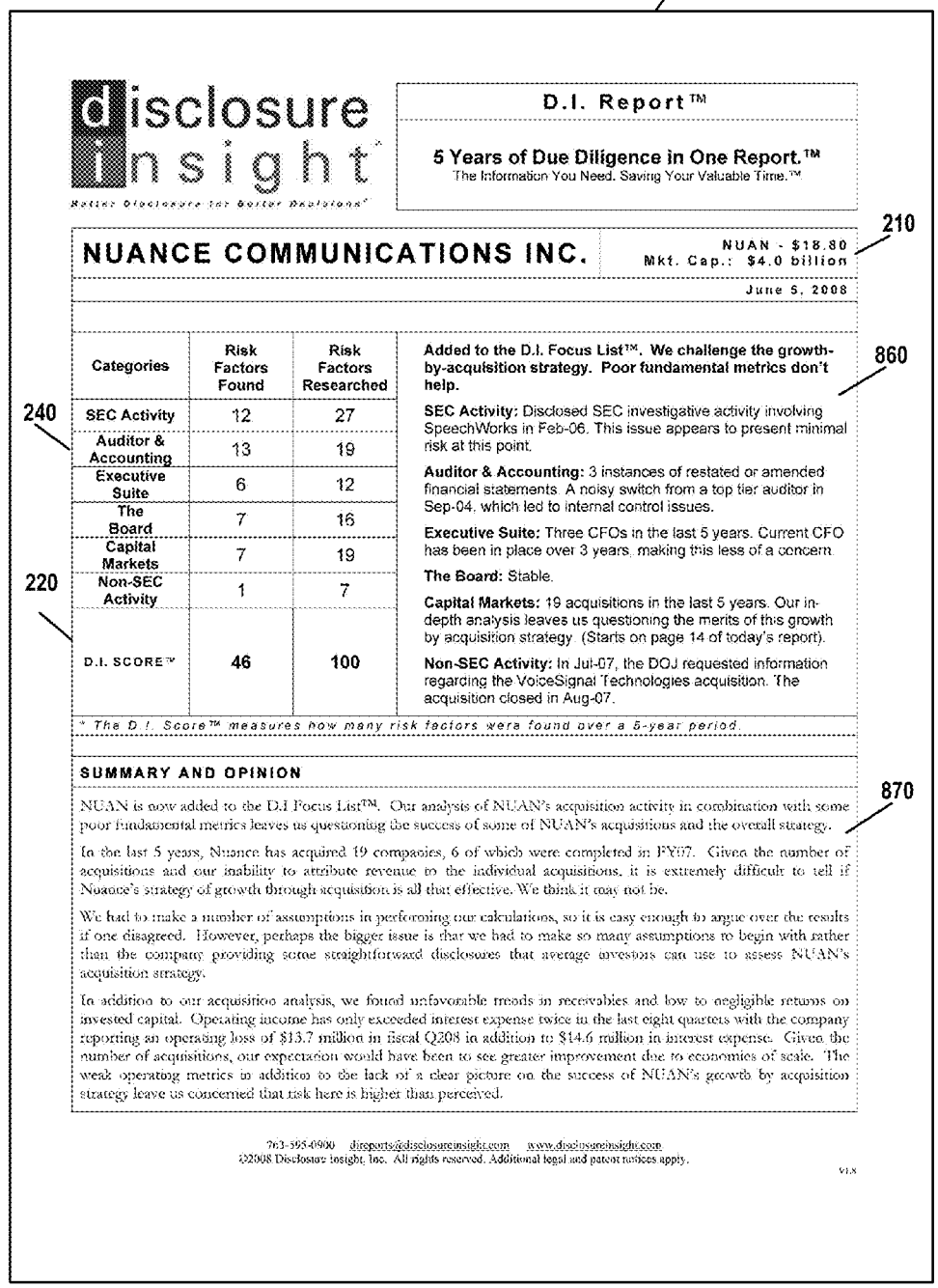
FIG. 8 shows another example profile for a company.

Referring now to FIGS. 8-10, another example profile 800 for a company is shown. The profile 800 includes information that was collected using the method 100 described above. The profile 800 is similar to that of the profile 200, except that the profile 800 includes some different content and is formatted differently.

For example, the profile 800 includes a box 860 that provides a summary of the general risk factor categories examined for the company. For example, the box 860 provides a summary of risk factor categories such as SEC Activity, Auditor & Accounting, Executive Suite, Board, Capital Markets, and Non-SEC Activity. In the example shown, a "quick take" or summary is provided for each of the relevant categories. Other factors can also be summarized as needed.

The profile 800 also includes a box 870 that has a narrative summary of the overall profile for the company. This narrative provides a snapshot of the most important potential risks associated with the company. For example, in the embodiment shown, the box 870 provides a summary of risks associated with a significant number of recent acquisitions, as well as unfavorable trends in receivables and low returns on capital investments. Other information can also be provided.

The profile 800 also includes a box 910 with highlights of information that has changed since the last profile was created for the company. For example, the box 910 includes a narrative of the significant changes, as well as a Table 920 that lists the scores for the company in each category for each time period for the profile. This allows the user to quickly view how the company's profile changes over time. For example, the Table 920 shows that the risk factors associated with the Capital Markets category has increased from "6" in the first report (dated Jan. 16, 2008) to "7" in the most recent report (dated Jun. 8, 2008). As the profile for a company is updated (e.g., on a monthly, quarterly, yearly, or other basis as noted below), the historic trends for the company are captured in the Table 920.

In example embodiments, one or both of the profiles 200, 800 can be delivered to a customer to assess the risk factors associated with a company. In other examples, the profile 200 can be used by analysts in gathering information associated with the risk factors, and the profile 200 can then be used to generate the profile 800 that is delivered to customers. Other configurations are possible.

Attached at Appendices B and C, which are hereby incorporated by reference, are examples of complete profiles for two companies.

Figure 11:
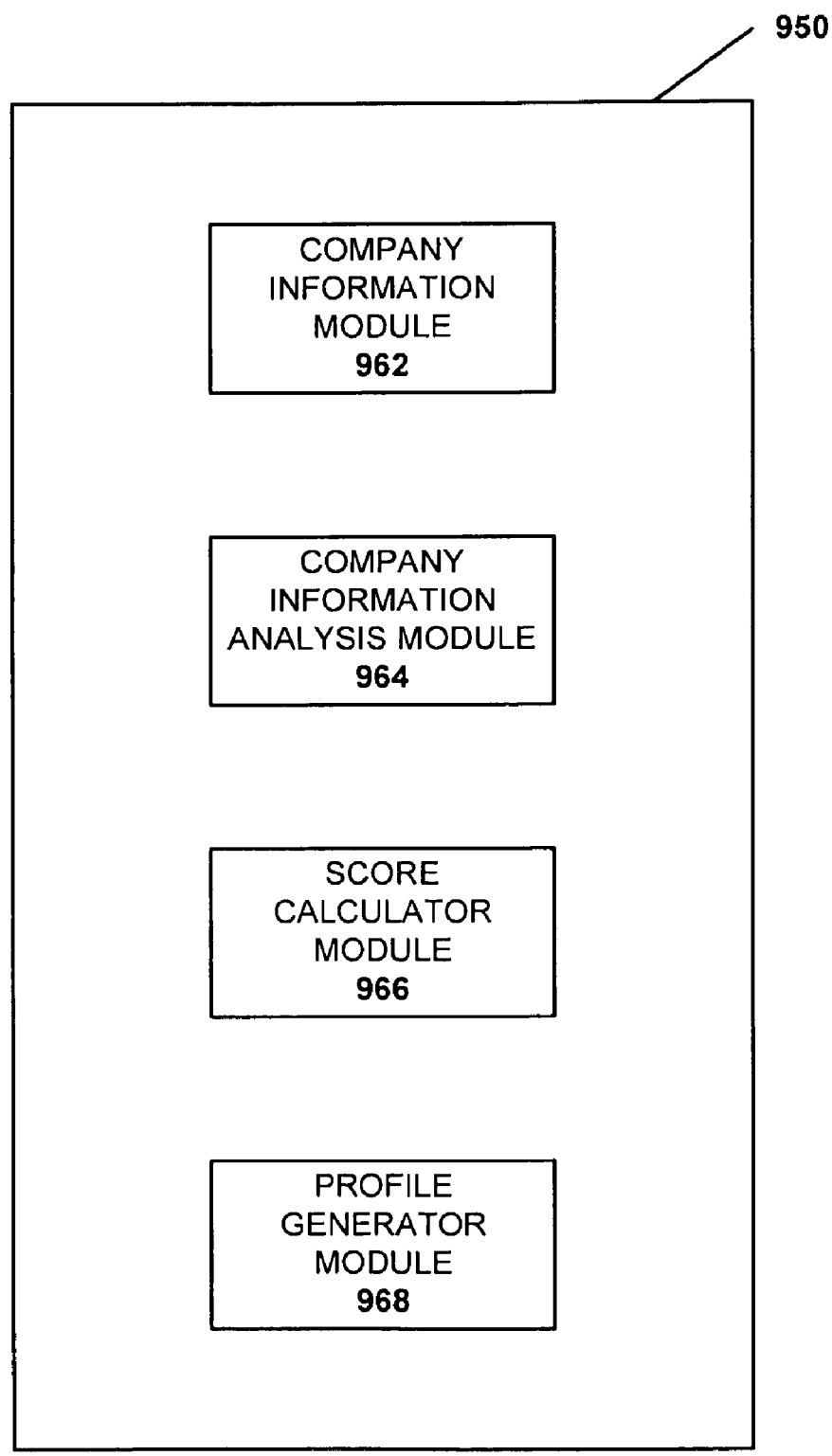
FIG. 11 shows an example system for creating a company profile.

Referring now to FIG. 11, an example system 950 for creating profiles for companies is shown. The system 950 includes a company information module 962, a company information analysis module 964, a score calculator module 966, and a profile generator module 968.

The company information module 962 is programmed to gather information about the company. For example, as described above, a number of publicly-available processes, such as FOIA requests, can be used to gather information about the company. The company information module 962 can implement an automated or semi-automated process to gather the information, or can be used manually as a repository of the information that is gathered by analysts.

The company information analysis module 964 is programmed to analyze the information the company information analysis module 964 receives about the company from the company information module 962. This analysis can include identifying risk factors associated with the company in a variety of categories, as described above. The company information analysis module 964 can implement an automated or semi-automated process to analyze the information, or can be used manually as a repository for the information that is analyzed by analysts.

The score calculator module 966 is programmed to calculate a score for the company based on the analyzed information from the company information analysis module 964. As described above, the calculation can involve summing each of the risk factors associated with the company to arrive at a score. The score calculator module 966 can implement an automated or semi-automated process to calculate the score, or can be used manually as a repository for the score that is calculated by analysts.

The profile generator module 968 is programmed to generate the profile for the company based on the information from the company information module 962, the company information analysis module 964, and the score calculator module 966. For example, the profile generator module 968 can create profiles similar to the profiles 200, 800 described above. The profile generator module 968 can implement an automated or semi-automated process to create the profiles, or can be used manually as a repository for the profiles that are created by analysts.

In examples embodiments, a plurality of profiles are generated for a plurality of companies. The profiles are stored in a repository, such as a database. The profiles can be distributed in hard copy or electronic formats. The profiles for a particular company can be updated periodically, such as once a month, once every 3 months, once every 6 months, or once a year. In some examples, each company's profile is updated periodically depending on how active and/or important the particular company is for a given time period.

In one example, the profiles are stored in an electronic format in a database that is accessible on the Internet. An individual can use a computer system to access the database and request one or more of the profiles. In one example, the individual's computer system, as well as a server associated with the database of profiles, includes a processing unit and computer readable media. Computer readable media can include memory such as volatile (such as RAM), non-volatile (such as ROM, flash memory, etc.) or some combination thereof. Additionally, the computer system and server can include mass storage (removable and/or non-removable) such as a magnetic or optical disks or tape. An operating system, such as Linux or Windows, and one or more application programs can be stored on the mass storage device. The computer system and server include input devices (such as a keyboard and mouse) and output devices (such as a display and printer). The computer system and server also include network connections to other devices, computers, networks, servers, etc.

In example embodiments, the individual's computer and the server associated with the database of profiles can communicate with one another through a network such as a local area network (LAN), a wide area network (WAN), the Internet, or a combination thereof. Communications can be implemented using wired and/or wireless technologies.

In example embodiments, the individual uses the computer system to access a web site hosted by the server to request one or more profiles. For example, individual can use a web browser application on the individual's computer system to access the server over known protocols such as hypertext markup language ("HTML") and/or extensible markup language ("XML"). One example of a browser application is the Internet Explorer browser offered by Microsoft Corporation. Other types of browsers and configurations are possible. In one example, each profile can be downloaded and stored on the individual's computer. In another example, each profile is displayed as a graphical user interface within the individual's browser such that the individual can review the information within the profile.

In one example, the individual can purchase profiles individually for the companies in which the individual is interested. In other examples, the individual can purchase a subscription that allows the individual to access a portion or all of the profiles within the database. For example, in one embodiment, the individual can purchase a subscription that allows access to profiles of companies within a specific industry, or a separate subscription that allows access to all profiles. Other configurations are possible.

The various embodiments described above are provided by way of illustration only and should not be construed to limiting. Those skilled in the art will readily recognize various modifications and changes that may be made to the embodiments described above without departing from the true spirit and scope of the disclosure or the following claims.

What is claimed is:

1. A method for analyzing risk, the method comprising:
identifying a plurality of categories of information that are defined as being relevant to risk associated with investing in securities of publicly traded companies, the plurality of categories of information including a category associated with Securities and Exchange Commission (SEC) activities, a category associated with auditor/accounting information, a category associated with executive suite information, a category associated with board information, a category associated with capital markets information, and a category associated with non-SEC activities;
compiling information about the publicly traded companies from a plurality of public sources, the information being compiled based at least in part by performing a first search utilizing a first search string having a first set of search terms, and by performing a second search utilizing a second search string having a second set of search terms, the second set of search terms being different than the first set of search terms, the first search being performed against a first database having Securities and Exchange (SEC) information, and the second search being performed against a second database having non-SEC information;
analyzing the compiled information to identify a plurality of relevant risk factors for each of the publicly traded companies;
using the identified plurality of risk factors for each of the publicly traded companies to rate a risk associated with each of the publicly traded companies;
utilizing a processing unit of a computing device to generate a profile for each of the publicly traded companies based on its corresponding identified plurality of risk factors;
obtaining updated information from the plurality of public sources for at least some of the publicly traded companies;
updating the profiles associated with the at least some of the publicly traded companies to account for the updated information;
receiving a request through a user interface for the profile of one of the publicly traded companies; and
providing the profile of the one of the publicly traded companies to the user interface, the provided profile including an indication of a name associated with the one of the publicly traded companies, an indication of the risk associated with the one of the publicly traded companies, and summary sections for each of the plurality of categories of information, the summary sections not including all of the compiled information but instead including only abbreviated summaries of the compiled information that are relevant to the identified plurality of relevant risk factors for the one of the publicly traded companies.

2. The method of claim 1, wherein generating the profile for each of the publicly traded companies further comprises creating a written report that details the profile for the publicly traded company and includes a total risk rating.

3. The method of claim 1, wherein analyzing the compiled information further comprises calculating a total risk rating for each of the publicly traded companies, the total risk rating for each of the publicly traded companies being calculated by summing and systematically assessing factors that are applicable for each of the publicly traded companies, and wherein the total risk rating for each of the publicly traded companies is listed on a front page of the profile for the company.

4. The method of claim 1, wherein compiling the information about the publicly traded companies selectively includes filing Freedom of Information Act requests to obtain information determined to be relevant to a due diligence process.

5. The method of claim 1, and further comprising:
highlighting information in the profile of the one of the publicly traded companies that has changed due to the updated information.

6. The method of claim 1, and further comprising:
providing access to the profiles of the publicly traded companies on a subscription basis that only allows for access to a portion of the profiles that corresponds to the publicly traded companies belonging to a specific industry.

7. The method of claim 1, and further comprising:
providing access to the profiles of the publicly traded companies on a subscription basis that is not industry specific and allows for access to all of the profiles.

8. The method of claim 1, and further comprising:
charging for access to the profiles on an individual basis.

9. The method of claim 1, wherein each of the profiles includes a narrative section that identifies important potential risks associated with the corresponding publicly traded company.

10. The method of claim 1, wherein the category associated with SEC activities includes information related to SEC affirmed active-and-ongoing investigative activity, SEC cited law enforcement grounds to block access to records, confidentiality assertions to have access to records blocked, SEC investigative activity, SEC non-investigative activity, SEC investigative disclosures that lack detail on a nature of a probe, SEC investigative disclosures that lack detail on a timing of first contact with the SEC, a disclosed investigation that is unspecified as to its formality, a formal SEC investigation being closed, an SEC investigative disclosure that that lacks details on who received subpoenas, an SEC investigative disclosure that lacks detail on what information subpoenas were sought, a delay in disclosing SEC investigation, an SEC investigation related to revenue recognition, a disclosure of a Wells Notice, a disclosure of a Wells Notice lacking detail, an availability of SEC Division of Corporation Finance comment letters, contact with SEC's Office of Chief Accountant, receipt of disclosed SEC comment letters, unresolved SEC comment letters, same or similar issues showing up in multiple SEC reviews, and revenue recognition being brought up in reviews.

11. The method of claim 10, wherein the category associated with auditor/accounting information includes information related to an auditor change, an internal investigation, a negative auditor opinion, a auditor disagreement, a noisy auditor departure, an auditor reference of an inability to meet SOX 404 requirements, an auditor indication of an inability to rely on management's representations, an auditor reference to illegal acts, an auditor not being top tier, internal control problems, any restatements, delayed filings, one-time charges, and a significant accounting change.

12. The method of claim 11, wherein the category associated with executive suite information includes information related to a CEO change, a CFO change, another senior office change, a major office involved in a criminal charge, a resignation in presence of a controversy, and a departure with a payoff.

13. The method of claim 12, wherein the category associated with board information includes information related to a chairman change, a person functioning as both CEO and chairman, an audit committee involved in an investigation, a retention of outside forensic accountants, a retention of outside legal counsel, a resignation in a presence of a controversy, a departure with a payoff, an audit committee member change, an independent director change, and an involvement in an internal investigation.

14. The method of claim 13, wherein the category associated with capital markets information includes information related to not holding conference calls, instances of litigation, merger and acquisition activity, acquisitions including earn-outs, disclosure of merger and acquisition integration challenges, multiple classes of stock, a small number of shares in a float, inside ownership, delisting threatened by regulators, a suspension in stock trading, an increase in insider selling, stock price volatility, a controlled company status, a revenue guidance being lowered, a violation of debt covenants, a lack of meaningful revenue, concentrated revenue, and a number of disclosed acquisitions.

15. The method of claim 14, wherein the category associated with non-SEC activities includes information related to United Sates attorney activity, Federal Bureau of Investigations activity, Grand Jury activity, Internal Revenue Service activity, and investigations by other regulators.

16. A method for analyzing risk, the method comprising:
identifying a plurality of categories of information that are defined as being relevant to risk associated with investing in securities of publicly traded companies, the plurality of categories of information including a category associated with Securities and Exchange Commission (SEC) activities, a category associated with auditor/accounting information, a category associated with executive suite information, a category associated with board information, a category associated with capital markets information, and a category associated with non-SEC activities;
performing a first search utilizing a first search string having a first set of search terms against a first public source to obtain information about the publicly traded companies;
performing a second search utilizing a second search string having a second set of search terms against a second public source to obtain additional information about the publicly traded companies, the second set of search terms being different than the first set of search terms, and the second public source being different than the first public source, the first public source having Securities and Exchange (SEC) information, and the second public source having non-SEC information;
analyzing the information and the additional information to identify a plurality of relevant risk factors for each of the publicly traded companies;
using the identified plurality of risk factors for each of the publicly traded companies to rate a risk associated with each of the publicly traded companies;
utilizing a processing unit of a computing device to generate a profile for each of the publicly traded companies based on its corresponding identified plurality of risk factors;
obtaining updated information from the plurality of public sources for at least some of the publicly traded companies;
updating the profiles associated with the at least some of the publicly traded companies to account for the updated information;
receiving a request through a user interface for the profile of one of the publicly traded companies; and
providing the profile of the one of the publicly traded companies to the user interface, the provided profile including an indication of a name associated with the one of the publicly traded companies, an indication of the risk associated with the one of the publicly traded companies, and summary sections for each of the plurality of categories of information, the summary sections not including all of the information and the additional information but instead including only abbreviated summaries of information that are relevant to the identified plurality of relevant risk factors for the one of the publicly traded companies.

17. The method of claim 16, and further comprising:
providing access to the profiles of the publicly traded companies on a subscription basis.

18. The method of claim 16, and further comprising:
charging for access to the profiles of the publicly traded companies on an individual basis.

* * * * *